United States Patent Office 3,185,620
Patented May 25, 1965

3,185,620
METHOD OF COMBATTING INSECTS WITH POLYSULFIDES
Lyle D. Goodhue, Rector P. Louthan, and Kenneth E. Cantrel, Bartlesville, Okla., assignors to Phillips Petroleum Company, a corporation of Delaware
No Drawing. Filed Feb. 5, 1962, Ser. No. 171,250
17 Claims. (Cl. 167—22)

This invention relates to the combatting of insects such as roaches, flies, etc. In one of its aspects, the invention relates to a method for combatting, especially repelling insects such as roaches, fruit flies, etc., employing a compound having the formula

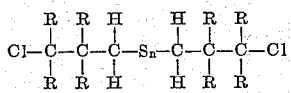

wherein $n$ is an integer in the range 2–5 and wherein R can be hydrogen or an alkyl radical having 1–5 carbon atoms. In another of its aspects the invention relates to a novel composition for combatting insects, the said composition containing a compound set forth and described herein. In a still further aspect of the invention it relates to a novel compound as set forth and described herein.

Insecticides and repellents are widely used for the control of insects. In many cases, insecticides are chosen since it is desired to kill the insect and completely rid an area, such as a house, of these pests. On the other hand, it is often more desirable to employ repellents, particularly in such locations as restaurants and stores where the sight of such insects has a definite effect on the customers or the appearance of food. Furthermore, repellents are widely used on persons to protect people from biting and annoying insects.

It is an object of this invention to provide a method for combatting insects. It is another object of this invention to provide a method for combatting roaches. It is another object of this invention to provide a method for killing roaches. It is another object of this invention to provide a method for repelling flies, such as fruit flies and stable flies. It is a still further object of this invention to provide a novel composition for combatting insects. It is a still further object of this invention to provide a compound suitable for use in the combatting, especially repelling, of insects. A further object of this invention is to provide method and composition for effectively protecting an area against invasion and/or ravaging by insects.

Other aspects, objects and the several advantages of the invention are apparent from a study of this disclosure and the appended claims.

According to the present invention there is provided a method and a composition for combatting insects, especially roaches, which comprises, in the method, utilizing a compound having the following structural characteristics:

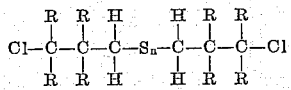

in which $n$ is an integer in the range 2 to 5 inclusive and in which R is selected from the group consisting of hydrogen and alkyl radicals having 1 to 5 carbon atoms.

Compounds having the structural characteristics as just set forth and which are repellents according to the present invention are:

Bis(3-chloropropyl) disulfide,
Bis(3-chloropropyl) pentasulfide,
Bis(3-chlorobutyl) trisulfide,
Bis(3-chloro-3-methyl-n-octyl) tetrasulfide,
Bis(3-chloro-2,2,3-trimethylbutyl) disulfide,
Bis(3-chloro-2,2,3-tri-n-pentyl-n-octyl) trisulfide,
Bis(3-chloro-2-methyl-2-ethyl-3-n-propylheptyl)pentasulfide,
3-chlorooctyl 3'-chlorobutyl disulfide, and
3-chloro-2,2-dimethylpropyl 3'-chloro-3'-n-propylhexyl trisulfide.

The repellents of this invention can be applied in conventional manners such as in solutions, emulsions, dusts, wettable powders, aerosols and the like. Solvents which can be employed include such materials as naphtha, kerosene, toluene, cyclohexanone, acetone and the like. One particularly effective solvent which can be used is an isoparaffinic hydrocarbon boiling in the approximate range of 260° F. to 800° F. which is sold under the trademark of Soltrol and usually produced by the HF alkylation of an isoparaffin with an olefin.

The amount of repellent in the solutions, emulsions, etc., can vary over a wide range, but will generally be within the range of from .05 to 20 percent by weight. In some instances, even lower concentrations can be used, while the upper limit is dictated primarily by economics.

When applying the repellents of this invention to an area from which it is desired to repel insects, such as roaches and fruit flies, the method of application will be chosen so as to deposit from 0.1 to 25 grams per 100 square feet. It is also to be understood that these repellents can be used as space sprays, employing such means as aerosol bombs.

The halogen-containing sulfide repellents of this invention can be prepared by a variety of methods. For example, bis(3-chloropropyl) sulfide can be prepared by the oxidation of 3-chloropropyl mercaptan with an oxidizing agent such as chlorine. Generally, this method of preparation is satisfactory for use with other halogen-containing mercaptans to produce the corresponding halogen-containing sulfide. Sulfides higher than the disulfides can be prepared by the reaction of the same type of halogen-containing mercaptans with elemental sulfur in the presence of an amine. The halogen-containing mercaptans which are employed as starting materials in the above described preparation method can be conveniently prepared by the reaction of an unsaturated chloride such as allyl chloride with $H_2S$ in the presence of a free radical initiator, such as ultraviolet light.

EXAMPLE I

Two runs were carried out in which bis(3-chloropropyl) disulfide and bis(3-chloropropyl) pentasulfide were synthesized and tested as repellents for roaches.

In one synthesis run, 240 grams of 3-chloropropyl mercaptan, prepared by the ultraviolet initiated reaction of allyl chloride with $H_2S$, was dissolved in two liters of n-pentane. Seventy-one grams of chlorine were then bubbled into the resulting solution, and after the chlorine addition had been completed, the reaction mixture was distilled. One hundred eight-seven grams of bis(3-chloropropyl) disulfide were recovered, boiling range 119° C.– 122° C. at 0.6 mm. Hg absolute pressure, refractive index $n_D^{20} = 1.5450$.

In the other synthesis run, 110.5 grams of 3-chloropropyl mercaptan and 64 grams of sulfur were slurried together, and to this slurry was added 10 ccs. of triethylamine. The amine was added slowly to the slurry over about a one-hour period, and the mixture was warmed on a steam bath during the amine addition. After all of the amine had been added, the reaction mixture was allowed to stand overnight. An orange slurry with an amine odor was recovered, amounted to 169.4 grams, refractive index $n_D^{20} = 1.6423$.

The above prepared halogen-containing sulfides were then tested as repellents for roaches by the following procedure. A colony of German roaches was maintained in a transparent plastic box measuring 8 inches by 12 inches by 8 inches. The box contained approximately 2,000 roaches. File cards, 3 inches by 5 inches, were dipped in acetone solutions containing various concentrations of the chemicals, after which the cards were hung up to dry overnight. The next day the plastic cages were placed on a lighted work table where observations could be made, and the cards were placed in the box at an angle so that the roaches could climb up on the cards. Observations were taken after one hour and after two hours to determine the number of roaches sitting on the treated cards. Similar observations were taken on untreated cards. The results of these tests are expressed below as Table I.

*Table I*

DIPPING SOLUTION

| Repellent tested | Grams repellent in 100 ml. of acetone | Mg./cm.² on card | Number of roaches | | |
|---|---|---|---|---|---|
| | | | 1 hr. | 2 hrs. | Total |
| Bis(3-chloropropyl) disulfide | 5 | 0.2175 | 0 | 0 | 0 |
| Bis(3-chloropropyl) pentasulfide | 5 | 0.2175 | 1 | 0 | 1 |
| Untreated check | 0 | | 148 | 101 | 249 |

EXAMPLE II

One of the halogen-containing sulfides prepared in Example I was tested as a repellent for stable flies.

In this test, organdy bags, fabricated from organdy sheets 10 inches square, were impregnated with one gram of the candidate repellent dissolved in 6–7 ml. of acetone and were then suspended on a line to dry. After 24 hours, the bags were drawn over the hand and exposed to several thousand hungry stable flies confined in 30-inch cubicle cages. The time to the first bite was recorded. If no bites were received in five minutes, the bag was withdrawn and inserted again on the following day. If, in the first five minute exposure, bites were obtained, three successive five minute exposures were made as described. If, however, no bites were obtained, further repetition was not made until the following day. The bags were suspended open to aeration between trials on successive days. Generally, the flies bite in less than a minute if the material is non-repellent. If a bite was received, the number of seconds were counted to the first, second and third bites. The results of these tests are given below in Table II.

*Table II*

| Compound tested | Number of seconds to 1st, 2nd, and 3rd bites in 5 minutes | |
|---|---|---|
| | 1st day | 2nd day |
| Bis(3-chloropropyl) disulfide | NB* | 10, 7, 14 |

* No bites.

EXAMPLE III

The halogen-containing sulfides prepared in Example I were tested as repellents for fruit flies (Drosophila).

In these tests, four different types of tests were used. Test type A was carried out by peeling 1 square inch of skin from a ripe tomato, thereby exposing the fleshy portion of the fruit, and providing a location for fruit flies to lay eggs. The exposed portion of the fruit was dipped into a 1 percent by weight solution of the candidate chemical in acetone. The treated tomato was then placed in a 30″ cubical cage containing 1,000 fruit flies. After 24 hours, the number of fruit fly eggs in the peeled portion of the tomato were counted.

Test B was carried out in the same manner as Test A, except that a 2 percent by weight solution of the candidate chemical was used, and the cage the tomato was placed in contained 2,000 fruit flies.

In Test C, the tomato, after dipping the 1 square inch peeled portion in a 2 percent by weight solution of the candidate chemical in acetone, was placed in a 1-pint ice cream carton containing 10 male and 10 female fruit flies. The eggs in the peeled portion of the tomato were counted after 24 hours.

In Test D, the procedure of Test C was followed, except the tomato was not used, and only 5 male and 5 female fruit flies were present in the carton. In this test, a fruit fly egg culture medium was used instead of the tomato, and a 0.35 x 5 cm. Petri dish containing the medium was dipped into a 2 percent by weight acetone solution of the candidate chemical prior to placing the treated medium in the carton.

Two types of control runs, one with acetone and one with no agent, were carried out for comparison with each type of test. The results of these runs are expressed below as Table III. In this table, the figures for each type of tests are the total for 5 replicates.

*Table III*

TWENTY-FOUR HOUR EGG COUNTS
[5 replicates in each test]

| Chemical | Test A | Test B | Test C | Test D | Total |
|---|---|---|---|---|---|
| Bis(3-chloropropyl) pentasulfide | 13 | 1 | 5 | 2 | 21 |
| Bis(3-chloropropyl) disulfide | 23 | 0 | 11 | 2 | 36 |
| Acetone check | 228 | 675 | 650 | 58 | 1,611 |
| Untreated check | 391 | 1,020 | 715 | 161 | 2,287 |

The compounds of the present examples show that the sulfur can vary from 2 to 5 inclusive in the characteristic structure:

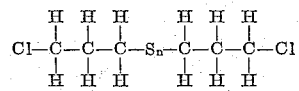

Reasonable variation and modification are possible within the scope of the foregoing disclosure and the appended claims to the invention, the essence of which as that a compound having the structural characteristics as herein set forth and described has been found effective for the combatting of insects, especially roaches and fruit flies.

We claim:

1. A method of combatting an insect which comprises subjecting said insect to the action of an effective amount of a compound having the formula:

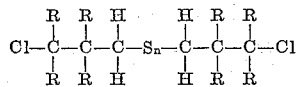

wherein $n$ is an integer in the range 2–5, inclusive, and R is a member selected from the group consisting of hydrogen and alkyl groups having 1–5 carbon atoms.

2. A method of combatting an insect which comprises subjecting said insect to the action of an effective amount of a compound having the formula:

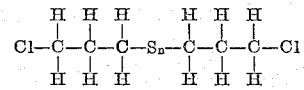

wherein $n$ is an integer in the range 2–5 inclusive.

3. A method of combatting an insect which comprises subjecting said insect to an effective amount of bis(3-chloropropyl) disulfide.

4. A method of combatting an insect which comprises subjecting said insect to an effective amount of bis(3-chloropropyl) pentasulfide.

5. A method of combatting an insect which comprises subjecting said insect to an effective amount of bis(3-chlorobutyl) trisulfide.

6. A method of combatting an insect which comprises subjecting said insect to an effective amount of bis(3-chloro-3-methyl-n-octyl) tetrasulfide.

7. A method of combatting an insect which comprises subjecting said insect to an effective amount of bis(3-chloro-2,2,3-trimethylbutyl) disulfide.

8. A method of combatting an insect which comprises subjecting said insect to an effective amount of bis(3-chloro-2,2,3-tri-n-pentyl-n-octyl) trisulfide.

9. A method of combatting an insect which comprises subjecting said insect to an effective amount of bis(3-chloro-2-methyl-2-ethyl-3-n-propylheptyl) pentasulfide.

10. A method of combatting an insect which comprises subjecting said insect to an effective amount of 3-chlorooctyl 3'-chlorobutyl disulfide.

11. A method of combatting an insect which comprises subjecting said insect to an effective amount of 3-chloro-2,2-dimethylpropyl 3'-chloro-3'-n-propylhexyl trisulfide.

12. A composition suitable for combatting an insect which comprises a compound having the formula:

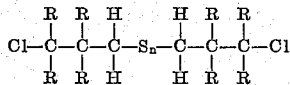

wherein $n$ is an integer in the range 2–5, inclusive, and R is a member selected from the group consisting of hydrogen and alkyl groups having 1–5 carbon atoms dispersed in an isoparaffinic solvent boiling in the approximate rang 260° F.–800° F.

13. A method of repelling fruit flies which comprises subjecting said flies to the action of a compound of claim 1.

14. A method of repelling fruit flies from tomatoes which comprises subjecting flies in the vicinity of tomatoes to the action of a compound of claim 1.

15. A method of combatting a roach which comprises subjecting said roach to an effective amount of a compound of claim 1.

16. A method of combatting a roach which comprises subjecting said roach to an effective amount of a compound of claim 2.

17. A method of combatting a roach which comprises applying to an area frequented by roaches an effective amount of a compound of claim 1.

References Cited by the Examiner

UNITED STATES PATENTS

| | | | |
|---|---|---|---|
| 2,529,493 | 11/50 | Harris et al. | 167—22 |
| 2,560,421 | 7/51 | Eby | 167—22 |
| 2,723,910 | 11/55 | Goodhue et al. | 167—22 |
| 2,917,429 | 12/59 | Scott et al. | 167—222 |
| 2,921,964 | 1/60 | Ramsden | 260—607 |
| 2,930,815 | 3/60 | Nedwick et al. | 260—607 |
| 3,004,885 | 10/61 | Kosmin | 167—22 |
| 3,010,870 | 11/61 | Luckenbaugh | 167—22 |
| 3,103,465 | 9/63 | Goodhue et al. | 167—22 |
| 3,116,335 | 12/63 | Birum | 260—608 |

OTHER REFERENCES

King: Chem. Evaluated as Insecticides and Repellants, U.S. Dept. of Agr., May 1954, p. 155.

LEWIS GOTTS, *Primary Examiner*.

M. O. WOLK, JULIAN S. LEVITT, *Examiner*.